United States Patent [19]
Jayashankar et al.

[11] Patent Number: 5,640,666
[45] Date of Patent: *Jun. 17, 1997

[54] COMPOSITE SILICIDE/SILICON CARBIDE MECHANICAL ALLOY

[75] Inventors: S. Jayashankar; Michael J. Kaufman, both of Gainesville, Fla.

[73] Assignee: University of Florida, Gainesville, Fla.

[*] Notice: The term of this patent shall not extend beyond the expiration date of Pat. No. 5,454,999.

[21] Appl. No.: 538,004

[22] Filed: Oct. 2, 1995

Related U.S. Application Data

[63] Continuation-in-part of Ser. No. 69,730, Jun. 1, 1993, Pat. No. 5,454,999.
[51] Int. Cl.$^6$ .............. C22C 1/04; C22C 1/10; B22F 3/14; B22F 9/00
[52] U.S. Cl. .............. 419/17; 419/32; 419/38; 419/47; 419/48; 419/54; 419/60; 75/236; 75/255; 75/351; 264/DIG. 36; 501/92
[58] Field of Search .............. 419/32, 38, 17, 419/47, 48, 54, 60; 75/230, 236, 255, 351; 428/570; 264/DIG. 36; 501/92

[56] References Cited

U.S. PATENT DOCUMENTS

| | | | |
|---|---|---|---|
| 4,927,792 | 5/1990 | Petrovic et al. | 501/92 |
| 4,970,179 | 11/1990 | Petrovic et al. | 501/92 |
| 5,000,896 | 3/1991 | Petrovic et al. | 264/86 |
| 5,069,841 | 12/1991 | Petrovic et al. | 264/86 |
| 5,454,999 | 10/1995 | Jayashankar et al. | 419/32 |

OTHER PUBLICATIONS

Metal Science, vol. 8, "Thermodynamic Properties of the System Molybdenum–Silicon," Chart, pp. 344–348 (1974).

J. Phys. Chem., vol. 64, "The Dissociation Pressures and the Heats of Formation of the Molybdenum Silicides," Searcy et al., pp. 1539–1542 (1960).

Trans. Metall. Soc. AIME, vol. 233, "The Intermediate-Temperature Oxidation Behavior of Molybdenum Disilicide," Berkowitz–Mattuck et al., pp. 1093–1099 (1965).

Scripta Metall., vol. 26, "On the Ductile-to-Brittle Transition Temperature in MoSi$_2$," Aikin, Jr., pp. 1025–1030 (1992).

Metall. Trans., vol. 23A, "Low-Temperature Oxidation of Molybdenum Disilicide," Meschter, pp. 1763–1772 (1992).

(List continued on next page.)

*Primary Examiner*—Charles T. Jordan
*Assistant Examiner*—Daniel Jenkins
*Attorney, Agent, or Firm*—Kerkam, Stowell, Kondracki & Clarke; Dennis P. Clarke

[57] ABSTRACT

A method of producing a composite powder by providing particles of (I) tungsten, niobium, zirconium, titanium or mixtures thereof, (II) silicon and (III) carbon in a proportion relative to each other so as to possess an overall chemical composition in that segment of the ternary diagram of FIGS. 2(a), 2(b), 2(c) and 2(d) designated A, and subjecting the particles to a mechanical alloying process under conditions and for a time sufficient to produce the composite powder. Also disclosed is a method of forming a substantially oxygen-free composition of matter comprising a matrix substance of WSi$_2$, NbSi$_2$, ZrSi$_2$, TiSi$_2$ or alloys thereof having SiC dispersed therein, the method comprising consolidating the above-described composite powder. Also disclosed is a method of forming oxidation- and wear-resistant coatings by subjecting the composite powder whose composition lies in segment A to a metallurgical process such as plasma spraying. A method of forming a composite material of uniformly dispersed particles of silicon carbide in a silicide or an alloy silicide matrix is also disclosed. The matrix contains alloy silicides such as (Mo,W)Si$_2$. The volume fraction of the silicon carbide may be varied from 10–90%. A method is also disclosed for producing hybrid composites consisting of a third phase of fibers or whiskers dispersed among a silicide/silicon carbide two-phase microstructure derived from the composite powder.

107 Claims, 2 Drawing Sheets

OTHER PUBLICATIONS

Mater. Sci. Eng., vol. A155, "Interfacial modification in Nb/MoSi$_2$ composites and its effects on fracture toughness," Xiao et al., pp. 135–145 (1992).

National Advisory Committee for Aeronautics, Research Memorandum, NACA RM E52B06, "Some Factors Affecting Fabrication and High–Temperature Strength of Molybdenum Disilicide," Maxwell (1952).

J. Am. Ceram. Soc., vol. 74, No. 10, "Carbon Additions to Molybdenum Disilicide: Improved High–Temperature Mechanical Properties," Maloy et al., pp. 2704–2706 (1991).

Mater. Sci. Eng., vol. A155, "Synthesis of molybdenum disilicide by mechanical alloying," Schwarz et al., pp. 75–83 (1992).

Scripta Metall., vol. 27, "Reaction Synthesis of MoSi$_2$ from High Purity Elemental Powders," Hardwick et al., pp. 391–394 (1992).

COMPOSITE SILICIDE/SILICON CARBIDE MECHANICAL ALLOY

Research leading to the completion and reduction to practice of the invention was supported, in part, by the Defense Advanced Research Projects Agency, Office of Naval Research, Department of Defense, Grant Nos. MDA972-88-J-1006 and N00014-91-J-4075. The United States Government has certain rights in and to the claimed invention.

RELATED APPLICATIONS

This application is a continuation-in-part of application Ser. No. 08/069,730 filed Jun. 1, 1993 (now U.S. Pat. No. 5,454,999 issued Oct. 3, 1995).

BACKGROUND OF THE INVENTION

1. Field of the Invention

The present invention relates to silicide/silicon carbide composites and articles of manufacture based thereon.

2. Discussion of the Prior Art

Silicides of transition metals such as molybdenum disilicide ($MoSi_2$) and composites comprising matrices of the transition metal silicide reinforced with silicon carbide (SiC) are considered valuable materials for high-temperature structural applications due to their high melting point, excellent oxidation and corrosion resistance, low density and good electrical and thermal conductivity properties. Similar to many other high-temperature intermetallics, the use of $MoSi_2$ is limited as a structural material due to its low ambient temperature fracture toughness and poor elevated temperature strength.

A number of approaches for the processing of this intermetallic are unsuitable due to its high melting point and owing to the fact that it exists as a line compound. Furthermore, the relatively high dissociation pressures of silicides such as $MoSi_2$ at elevated temperatures result in uncontrolled second phase formation due to silicon volatilization [T. G. Chart, Metal Science, Vol. 8, p. 344 (1974); and Searcy et al, J. Phys. Chem., Vol. 64, p. 1539 (1960)]. In view of these characteristics, powder processing has been the preferred fabrication route due to the lower processing temperatures that it affords; unfortunately, it also results in the incorporation of silica (originally formed as a surface layer on the powder particles [Berkowitz-Mattuck et al, Trans. Metall. Soc. AIME, Vol. 233, p. 1093 (1965)]) into the consolidated samples. The presence of grain boundary silica either as a continuous film or as discrete particles is detrimental since the particles may serve as crack nucleation sites at lower temperatures, while enhancing deformation via grain boundary sliding at temperatures about 1,200° C. where the silica softens appreciably. In fact, recent studies have shown that low silica polycrystalline $MoSi_2$ displays negligible "plasticity" below 1,400° C. [Aikin, Jr., Scripta Metall., Vol. 26, pp. 1025–1030 (1992)]. Silica formation also alters the matrix stoichiometry and results in the formation of $Mo_5Si_3$. Such stoichiometric deviations degrade the intermediate temperature oxidation resistance [Meschter, Metall. Trans., Vol. 23A, pp. 1763–1772 (1992)] of the silicide. Finally, silica has also been reported to cause the degradation of the diffusion barrier coatings at the fiber-matrix interface in ductile fiber-reinforced $MoSi_2$ [Xiao et al, Mater. Sci. Eng., Vol. A155, p. 135 (1992)].

In attempting to control the oxygen content of $MoSi_2$ by varying the starting powder size and by intentional carbon additions (deoxidant), Maxwell [NACA RM E52B06 (1952)] found that a fine-grained material with carbon additions had better creep properties and lower high-temperature plasticity than a similar grain-size material without carbon. More recently, Maloy et al [J. Am. Ceram. Soc., Vol. 74, p. 2704 (1991)] also reported improved elevated temperature fracture toughness with varying levels of carbon additions. However, substantial (~40%) weight losses were reported on consolidating these samples, resulting in uncontrolled formation of Mo-rich second phases. Hardwick et al [Scripta Metall., Vol. 27, p. 391 (1992)] attempted to process oxygen-free $MoSi_2$ by conducting all the powder handling and consolidation steps under vacuum or inert gas atmospheres. However, these approaches [Hardwick et al (supra) and Schwarz et al, Mater. Sci. Eng., Vol. A155, p. 75 (1992)] are impractical from the standpoint of processing bulk structural parts due to the difficulties involved in the scale-up of the evacuation systems, as well as the excessive costs that would be associated with such processes.

Other methods for forming $MoSi_2$/SiC composites are described in U.S. Pat. Nos. 4,927,792 and 5,000,896.

Methods for the production of alloy silicide/SiC composites are described in U.S. Pat. Nos. 4,970,179 and 5,069,841.

The difficulties encountered above are also encountered in forming silicide/silicon carbide composites wherein the silicide component is derived from tungsten, niobium, zirconium and titanium, as well as mixtures or alloys thereof with each other and with molybdenum.

It is, therefore, clear that further enhancements in the properties of silicide based composites are possible only with the elimination of silica (and oxygen) in the matrix, along with close control of the overall stoichiometry, through the use of simple and economical processing schemes that do not necessitate elaborate care during powder handling.

It is an object of the present invention to provide novel, substantially silica-free, silicide/SiC composites, methods for their production and articles of manufacture derived therefrom which are not subject to the above-noted disadvantages.

It is another object of the invention to form a composite material of uniformly dispersed particles of silicon carbide in a silicide or an alloy silicide matrix.

It is also an object of the invention to provide enhanced high-temperature properties in silicide matrices, especially above the softening temperature of the silica, through the elimination of the siliceous intergranular phase and its conversion to stable silicon carbide through in situ carbothermal reduction reactions.

SUMMARY OF THE INVENTION

The above and other objects are realized by the present invention, one embodiment of which relates to a method for producing a composite powder by providing (I) particles of a transition metal such as tungsten, niobium, zirconium, titanium, or alloys or mixtures thereof with each other or with molybdenum, (II) silicon and (III) carbon in a proportion relative to each other so as to possess an overall chemical composition in that segment of the ternary diagram of FIG. 2 designated A, and subjecting the particles to a mechanical alloying process under conditions and for a time sufficient to produce the composite powder.

Another embodiment of the invention comprises a composite mechanical alloy powder having a composition in that segment of the ternary diagram of FIG. 2 designated A.

An additional embodiment of the invention comprises a method of forming a substantially silica-free composition of matter comprising a matrix substance of the above-described transition metal silicide having SiC dispersed therein, the method comprising consolidating the composite powder described above.

Yet another embodiment of the invention relates to the composition of matter formed by the above-described consolidation method.

A further embodiment of the invention concerns articles of manufacture comprising the above-described consolidated composition of matter.

Yet an additional embodiment of the invention relates to a method of producing hybrid composites consisting of a third phase (preferably fibers or whiskers) dispersed among a silicide/silicon carbide two-phase microstructure derived from the composite powder.

DETAILED DESCRIPTION OF THE INVENTION

The present invention is predicated on the discovery that a novel composite body comprising a transition metal silicide and SiC, having enhanced strength properties and a wide variety of applications, all unshared by such composites prepared according to prior art methods, can be produced substantially oxygen-free, i.e., silica-free, by mechanically alloying pure powders of the transition metal or mixtures thereof, silicon and carbon and subsequently consolidating or processing them such that the transition metal silicide and SiC are formed in situ. Advantage is taken of a simultaneously on-going carbothermal reduction reaction whereby any silica is reduced to silicon carbide. The mechanically alloyed composite powders are capable of being consolidated, for example, by a host of powder metallurgical techniques to produce SiC-reinforced transition metal silicide articles having heretofore unattainable high-temperature structural properties. The mechanically alloyed powders can also be subjected to processes such as plasma spraying in order to provide coatings of transition metal silicide and SiC on the desired articles. The proportion of the transition metal silicide and SiC in these coatings may be varied by varying the composition of the mechanically alloyed powder along segment A of FIG. 2.

Throughout the specification and in the appended claims, the following terms have the meanings and definitions set forth hereinbelow:

"Composite" is used herein to denote man-made materials in which two or more constituents are combined to create a material having properties different than those of either constituent. One type of composite identified herein is a composite powder which consists of a physical mixture of two or more constituent powders formed due to mechanical alloying. Another type of composite is, e.g., a binary or ternary (or higher) matrix composite which consists of a matrix material, e.g., transition metal silicide, and a reinforcement material, e.g., SiC, distributed in and bound together by the matrix.

"Mechanical alloying" as used herein refers to the well known high-energy attrition process whereby atomic scale mixing of elements occurs under conditions of high impact between the particles such that cold welding of the elements occurs to produce a particulate alloy of the elements. The high attrition energies are preferably achieved in a ball milling system.

The term "substantially silica-free" is intended to refer to composites containing less than about 1% by weight of $SiO_2$.

"Consolidating" as used herein is intended to refer to any of the well known techniques for converting powdered materials to dense, self-supporting, composite articles. The term embraces, but is not limited to, sintering, hot-pressing, extrusion, hot-forging, hot-rolling, swaging, HIPing or any other applicable powder metallurgical technique.

The mechanical alloying process consists of the repeated welding, fracturing and re-welding of the powder particles in a high energy ball mill. Alloying is effected by the ball particle collisions in several stages. The progress of alloying can be studied in detail by following the microstructural changes by X-ray diffraction, transmission electron microscopy and scanning electron microscopy.

The powder size gets finer through the passage of time through the mechanical alloying process and the final powder size is typically less than 1 micron. The composition of the individual powder particles also converges to that of the blend composition. The final stage of the mechanical alloying process is a steady state process.

The mechanical alloying process may be carried out in small shaker mills such as the Spex mill for processing a few grams of powder, or in a high energy mill such as the Szegvari attritor (0.5 kg to 100 kg of powder). For the processing of larger batches of powder (up to 2,000 kg), it is more convenient to use conventional ball mills that may rotate around a central horizontal axis. The ball mill approach can achieve high energy conditions by ensuring a large diameter of the mill (at least 0.5 m, and preferably over 2.5 m) and rotation below a certain critical speed [see U.S. Pat. No. 4,627,959]. The scaling-up from one process to the next is not direct and the process parameters for the different systems are not known to be related.

Mechanical alloying of the constituent elements results in the formation of a microstructurally uniform and compositionally homogeneous alloy of the desired stoichiometry and the carbothermal reduction process utilizes the reducing properties of carbon to convert silica to silicon carbide. In addition, mechanical alloying enables the homogeneous dispersion of carbon throughout the matrix to facilitate these reactions.

The particle sizes of elemental powders of transition metal, Si and C to be mechanically alloyed may range from about 1 μm to about 100 μm, although the range of the starting particle size will not limit the scope of the process. In general, it is to be recognized that smaller particle sizes lead to higher surface area per unit mass of the particles and, therefore, to increased possibilities of contamination.

The initial composition of the transition metal-Si—C powder is chosen to form a composite alloy close to the transition metal silicide/SiC tie line of FIG. 2, but which is slightly transition metal-rich, i.e., lying in segment A of the diagrams. Thus, composites having varying volume fractions of SiC can be formed according to the method of the invention.

Elemental powders in the desired proportion are introduced into a conventional water-cooled planetary attritor employed in conventional mechanical alloying processes and the mechanical alloying is carried out using hardened steel milling media, preferably under a slight over-pressure of titanium-gettered argon or any other medium suitable for excluding oxygen.

The mechanical alloying process is continued until such time that further milling or alloying does not alter the structural characteristics of the powder. Generally, it should correspond to the state where the elements are distributed in a homogeneous manner throughout the mechanically alloyed composite powder.

The time for the mechanical alloying process is not a unique or constant processing parameter, but is rather dependent on a host of conditions such as the type of mill (Spex versus Szegvari), the ratio between the milling media and the powder charge, the size of the mill, the type of the elemental powders to be milled, etc. The process parameters of the different systems are not known to be related and determination of the processing conditions such as the time for complete alloying is accomplished by following the progress of the mechanical alloying process through such techniques as X-ray diffraction, scanning and transmission electron microscopy.

The choice of the milling media or the milling container need not be limited to hardened steel alone. Wear-resistant ceramic media such as tungsten carbide may also be employed as both the milling media and liners for the attrition mill. A major consideration governing the choice of milling media is the contamination resulting from wear and abrasion during the milling process. This dictates the choice of the milling media.

The mechanical alloying process can alternatively be carried out in small shaker mills such as the Spex mill for processing a few grams of the powder, or in high energy mills such as the Szegvari attritor (0.5 kg to 100 kg of powder). For the processing of larger batches of powder (up to 2,000 kg), conventional ball mills with high energy capacity may also be employed.

The particle size of composite alloy powder produced by the mechanical alloying process will depend, of course, upon the conditions and duration of the attrition-MA process. Generally, however, the product will have a particle size in the range of from about 0.01 μm to about 50 μm, and preferably from about 0.1 μm to about 5 μm.

Figure 1:
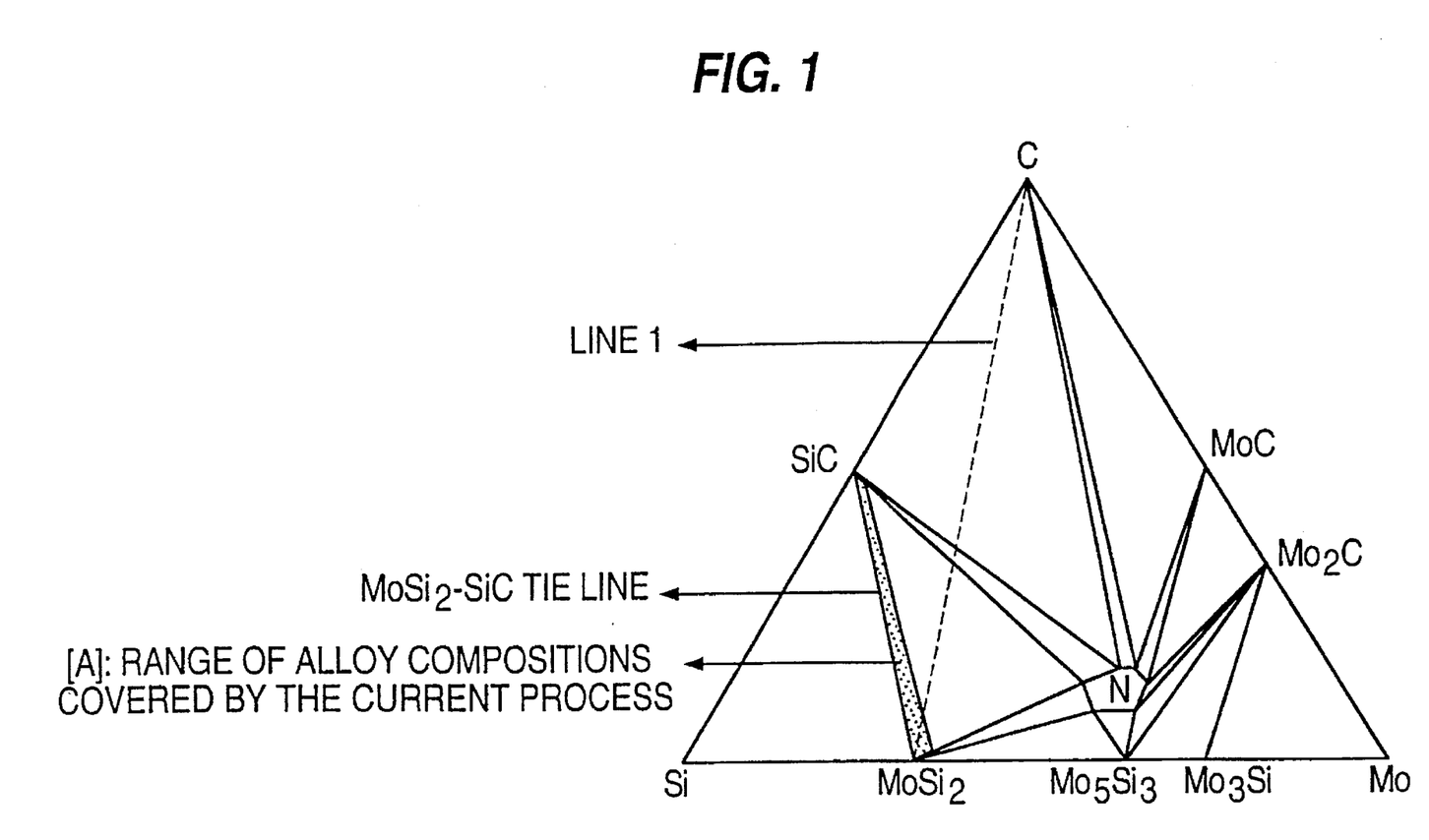
FIG. 1 is a ternary diagram of Mo—Si—C compositions.
Figure 2A:
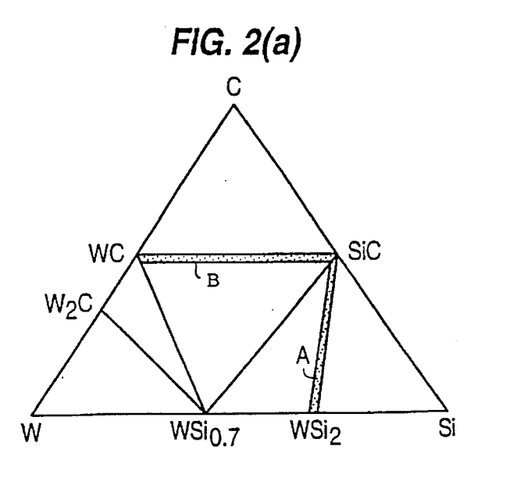
FIGS. 2(a), 2(b), 2(c) and 2(d) show prior art ternary isotherms of W—Si—C, Nb—Si—C, Zr—Si—C and Ti—Si—C, respectively.
Figure 2B:
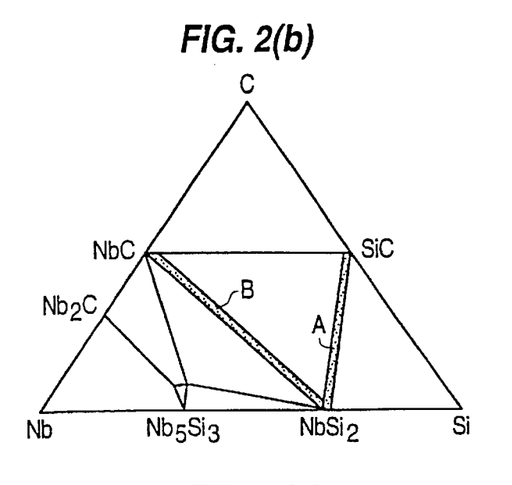
Figure 2C:
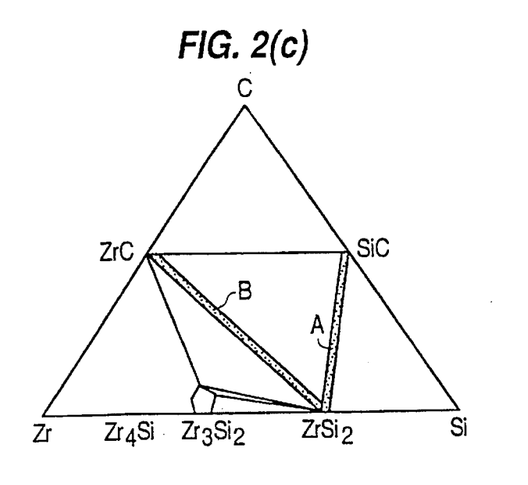
Figure 2D:
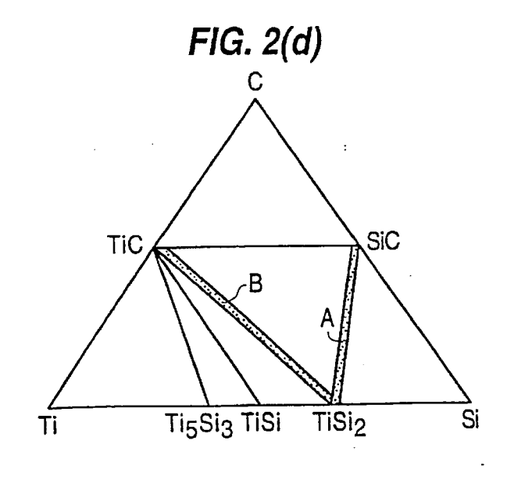

Ternary isotherms of the Mo—Si—C system, as shown in FIG. 1, were constructed by Nowotny et al [Monatsh. fur Chemie, Vol. 85, p. 255 (1954)] at 1,600° C. and by Brewer et al [J. Electrochem. Soc., Vol. 103, p. 38 (1956)] at around 1,727° C. Subsequently, Van Loo et al [High Temp. High Press., Vol. 14, p. 25 (1982)] constructed a 1,200° C. isotherm after examining arc-melted alloys and diffusion couples. The only ternary phase in the Mo—Si—C system is the "Nowotny phase" which has the approximate formula $C_{<1}Mo_{<5}Si_3$ and a relatively wide homogeneity range [Nowotny et al (supra); Parthe et al, Acta Crystallogr., Vol. 19, p. 1030 (1965); Brewer et al (supra); and Van Loo et al (supra)]. Minor additions of carbon to $Mo_5Si_3$ destabilize its tetragonal structure and result in the formation of a carbon-stabilized hexagonal Nowotny phase. These Nowotny phases have the general formula $T^1{}_3T^{11}{}_{<2}M_3X_{<1}$ where T denotes a transition metal, M represents Ge or Si, and X denotes a non-metal such as C, O, B or N [Parthe et al (supra)]. The presence of carbon-centered tetrahedra is characteristic of the Nowotny phases and accounts for their stability. While the isotherms of Nowotny et al and Brewer et al are in good agreement with each other in their prediction of the existence of a three-phase field between $MoSi_2$, $C_{<1}Mo_{<5}Si_3$ and SiC, the results of Van Loo indicate the co-existence of $Mo_5Si_3$, SiC and $C_{<1}Mo_{<5}Si_3$ at 1,200° C. Recently, it has been postulated by Costa e Silva et al [submitted to Metall. Trans., 1993] that the Van Loo and Brewer diagrams are consistent with each other only if a Class II, four-phase reaction ($MoSi_2$+Nowotny→SiC+ $Mo_5Si_3$) exists between the temperatures at which these isotherms were constructed, i.e., 1,200° C. and 1,727° C.

Based on the 1,600° C. isotherm of Nowotny and the 1,727° C. isotherm of Brewer, it is clear that ternary powder alloys within the composition limits established by the $MoSi_2$+$C_{<1}Mo_{<5}Si_3$+SiC three-phase field should form a thermally stable, three-phase microstructure when consolidated at these temperatures, provided that the powders are sufficiently homogeneous to minimize the diffusion length scales so as to establish equilibrium within the short time frames of the consolidation process. Here it is assumed that the nature of the isotherms is unaltered by the presence of small amounts of oxygen present as surface $SiO_2$ on the powders. While part of the carbon would take part in the deoxidation/carbothermal reduction reactions, the unreacted residual carbon would exist in equilibrium, as dictated by the isotherm.

For the formation of $MoSi_2$/SiC composites with a minimal amount of the Nowotny phase, it is necessary to start with nominal compositions slightly to the Mo-rich side (i.e., segment A of FIG. 1) of the $MoSi_2$/SiC tie line to restrict the compositional variations (carbon and silicon losses) due to the carbothermal reduction reactions do not shift the overall composition to the adjacent Si+SiC+$MoSi_2$ field where the silicon would experience incipient melting and thus result in the degradation of the high-temperature mechanical properties. Bearing this in mind, it is possible to vary the amount of the reinforcing SiC phase in the $MoSi_2$ matrix by simply choosing compositions at various points along the tie line. Note that the formation of the thermodynamically expected microstructure may also be limited by various kinetic constraints. Similarly, processing-related effects such as porosity can also be appropriately controlled in view of the gaseous by-products formed as a result of the carbothermal reduction reaction.

The primary aim of the present invention is to form low oxygen (low silica) content composites comprised of silicides and silicon carbide. To attain this objective, use is made of the carbothermal reduction reaction in order to reduce the silica to silicon carbide. Carbon, the essential element necessary to deoxidize the matrix, is incorporated through mechanical alloying. Mechanical alloying is a high energy attrition process where atomic scale mixing of the elements occurs.

The processing of oxygen-free transition metal silicide by carbon additions requires the following two considerations:

(1) Elimination of the $SiO_2$ through its conversion to SiC. The overall reaction can be written as:

$$SiO_2+3C\rightarrow SiC+2CO.$$

The thermodynamics of this reaction indicate that it is feasible above 1,450° C. In order for the above deoxidation reaction to proceed in the forward direction (SiC formation), the gaseous by-products (for example, CO) of the reaction must be removed. If this is not accomplished properly, considerable amounts of entrapped porosity would develop in the compact. This necessitates the use of vacuum levels of better than $10^{-2}$ Torr in order to evacuate the product gases from the compact. The compact should also have sufficient open porosity prior to and during the deoxidation reaction so that the product gases are evacuated easily from regions such as the core of the compact. However, upon completion of the deoxidation, all porosity (both open and closed) should be minimized or eliminated.

(2) Prevention of silicon volatilization. One of the peculiar characteristics of the silicide bodies (especially at temperatures above 1,550° C.) is that they dissociate to form silicon vapor at pressures below ½ an atmosphere. Furthermore, the tendency for dissociation increases with an increase in the temperature. Thus, conditions typically present during consolidation such as low vacuum levels (and temperatures above 1,550° C.) would result in the progressive evaporation and loss of the elemental silicon from the silicide body in the form of silicon vapor. The final body would then not contain the desired microstructure (a mixture of silicon carbide and the disilicide), but would have considerable amounts of undesirable phases containing lesser amounts of silicon. It is, however, possible to avoid such silicon losses by maintaining an over-pressure of argon greater than the dissociation pressure.

From the above considerations, it may be seen that maintaining a constant vacuum atmosphere or a constant argon (over-pressure) atmosphere for the duration of the hot consolidation operation of the alloyed transition metal-Si—C powder will not yield the desired microstructures due to the conflicting requirements of the deoxidation and silicon volatilization reactions. Maintaining a constant vacuum level of better than $10^{-3}$ Torr, while efficiently removing the entrapped gases at lower temperatures, also leads to silicon volatilization at temperatures above 1,550° C. On the other hand, maintaining a constant argon over-pressure, while eliminating the silicon volatilization, results in incomplete deoxidation and substantial sample porosity.

To achieve the optimum microstructure, the present process is carried out in two stages. The powder is initially loaded in the dies and very low pressure (less than 10 MPa) is applied on the cold compact so that the sample has sufficient open porosity. The sample temperature is ramped to 1,350° C. to 1,500° C. and held at such temperature for 30 minutes under a vacuum of better than $10^{-2}$ Torr in order to deoxidize the matrix. The sample is subsequently heated to 1,550° C. to 1,850° C. under an argon over-pressure and densified for 1 hour at such temperature under a pressure of 20-40 MPa. The consolidation temperature is usually selected such that it is well below the melting point of the silicide matrix.

The table below lists the melting points of various silicides and can be used as an aid in determining an appropriate consolidation temperature.

| Silicide | Crystal System | Type of Structure | Theoretical Density (g/cc) | Melting Point (°C.) |
|---|---|---|---|---|
| $TiSi_2$ | Orthorhombic | C54 | 4.12 | 1540 ± 5 |
| $ZrSi_2$ | Orthorhombic | C49 | 5.02 | 1680 |
| $NbSi_2$ | Hexagonal | C40 | 5.69 | 1950 ± 50 |
| $MoSi_2$ | Tetragonal | $C11_b$ | 6.3 | 2030 ± 50 |
| $WSi_2$ | Tetragonal | $C11_b$ | 9.86 | 2150 ± 50 |

Subsequently, the pressure on the compact is released and the sample is cooled at 5° C. per minute to room temperature. Furthermore, the uniform dispersion of carbon in the mechanically alloyed powder also ensures the uniform dispersion of the silicon carbide formed as a result of the carbothermal reduction reactions and the cooperative displacement reactions. The powder formed as a result of the mechanically alloying process is very fine (less than 1 micron). As known by those skilled in the art, the use of such fine powders aids in the densification of materials.

It should be noted that the deoxidation of commercial transition metal silicides by carbon additions without a commensurate increase in the silicon content [Maxwell (supra) and Maloy et al (supra)] would result in compositional shifts along an imaginary line between the transition metal silicides and C and a corresponding increase in the amount of the Nowotny phase according to the diagrams by Nowotny and Brewer (FIG. 2).

It is possible, according to the present invention, to produce hybrid composites consisting of a third phase dispersed among a silicide/silicon carbide two-phase microstructure derived from the composite powder. The third phase may be a ductile phase such as a refractory metal or it may be a brittle phase having excellent high-temperature properties, i.e., graphite, SiC, $TiB_2$, $Al_2O_3$, TiC, boron, etc. Furthermore, this additional or third phase may be in the form of whiskers, laminates, particulates or fibers. When present as fibers, the third phase may be introduced in the form of discontinuous, randomly oriented fibers or as continuous fibers in the form of mesh, screens or a three-dimensional interwoven network. Furthermore, the third phase may be subject to physical or chemical treatment of its surface so as to alter the interfacial characteristics between the third phase and the matrix. In addition, the interfacial layers may also be altered chemically during the production of the composite through in situ reactions.

Referring to FIG. 2, the ternary isotherms at 1,727° C. of the W—Si—C, Nb—Si—C, Zr—Si—C and Ti—Si—C systems as proposed by Brewer et al (supra) are illustrated. Using the same arguments that were presented for the Mo—Si—C system of FIG. 1, it can be easily seen that the overall powder compositions that are close to the $WSi_2$—SiC, $NbSi_2$—SiC, $ZrSi_2$—SiC and $TiSi_2$—SiC tie lines, but slightly to the left of the tie lines (segment A in FIG. 2) which are produced by mechanical alloying, will result in the in situ synthesis of the respective silicide/silicon carbide composites when subjected to a similar consolidation sequence as described for the Mo—Si—C alloys. The same rationale can be extended for the production of plasma sprayed coatings, as well.

In the case of the alloy silicides, it is well known, for example, that the $MoSi_2$—$WSi_2$ system is isomorphous, with $MoSi_2$ and $WSi_2$ possessing the same tetragonal crystal structure and exhibiting unlimited solubility for one another. This characteristic makes the processing of the $(Mo,W)Si_2$/SiC composites feasible. Not only would it be possible to vary the SiC particulate content in the composite, but also the relative amounts of $MoSi_2$ and $WSi_2$ in the matrix.

Still referring to FIG. 2 and applying the same argument to segment B, it can be clearly seen that composite mechanical alloy powders with the compositions in segment B should form WC/SiC, $NbC/NbSi_2$, $ZrSi_2/ZrC$ and $TiSi_2/TiC$ composites when subject to hot consolidation as indicated hereinabove.

Oxidation- and wear-resistant coatings may be formed by subjecting the composite powder whose composition lies in segment A of FIGS. 1 or 2 to a metallurgical process such as plasma spraying.

The invention is illustrated by the following non-limiting examples:

EXAMPLE 1

$WSi_2$/SiC Composite 5.804 grams of tungsten powder (12 μm size), 2.184 grams of silicon (−325 mesh) and 0.192 gram of carbon (−300 mesh) were weighed and loaded along with 3 numbers of ½-inch diameter hardened steel balls as the milling media into a hardened steel vial in an argon atmosphere maintained in a glove box, it being understood that any suitable controlled environmental enclosure, e.g., glove box, etc., can be utilized. The vial was sealed from the outside atmosphere by means of a lid with an elastomeric O-ring. The contents of the vial were subjected to high energy attrition in a Spex mill for a period of 48 hours. During the course of the operation, the vial temperature reached about 120° C. The vial was subsequently removed from the mill, allowed to cool to room temperature and reopened inside the glove box.

Subsequently, about 7.5 grams of the attrited powder were loaded in a graphite die and subjected to a hot consolidation cycle. The initial preload on the cold compact was 5 MPa. This pressure ensured that the open porosity in the compact was sufficient for the complete removal of the gaseous by-products of the subsequent deoxidation reaction. The atmosphere surrounding the die was evacuated to a vacuum of $10^{-2}$ Torr or better and the die was heated to 1,520° C. at a rate of ~15° C./minute and held at such temperature for a period of approximately 30 minutes to 1 hour in order to deoxidize the sample through the carbothermal reduction reaction. Subsequent to the hold period, the hot pressing chamber was backfilled with argon to a pressure of ½ an atmosphere or more and the temperature of the die was raised to 1,750° C. at a rate of ~10° C./minute. The uniaxial pressure on the sample was also simultaneously raised to 40 MPa and retained at such level. The sample was held at the peak temperature for a period of 1 hour to equilibrate the sample and to fully densify the same. After this hold period, the pressure on the sample was released and the sample was cooled at a rate of 10° C./minute or lower to room temperature. Back-scattered electron imaging under the scanning electron microscope showed a predominantly two-phase microstructure consisting of $WSi_2$ and SiC, with the SiC present in volume fractions of approximately 20%. The SiC was uniformly dispersed throughout the microstructure and varied in size from 1 to 7 μm. Qualitative analysis of the sample by Energy Dispersive Spectrometry revealed that the matrix phase corresponded to $WSi_2$. A negligible amount of silica (less than 1 volume percent) was observed under polarized light under an optical microscope.

EXAMPLE 2

(Mo,W)Si$_2$/SiC Composite

The following example describes the production of a (Mo,W)Si$_2$/SiC alloy silicide composite. The matrix comprises an alloy silicide, (Mo,W)Si$_2$, with MoSi$_2$ and WSi$_2$ present in equimolar quantities (i.e., 50 mol % MoSi$_2$ and 50 mol % WSi$_2$).

2.332 grams of Mo powder (2–4 μm size), 4.378 grams of tungsten powder (12 μm average size), 3.177 grams of silicon (–325 mesh) and 3.13 grams of carbon (–300 mesh) were weighed and loaded along with 3 numbers of ½-inch diameter hardened steel balls as the milling media into a hardened steel vial in an argon atmosphere maintained in a glove box. The vial was sealed from the outside atmosphere by means of a lid with an elastomeric O-ring. The contents of the vial were subjected to high energy attrition in a Spex mill for a period of 48 hours. During the course of the operation, the vial temperature reached about 120° C. The vial was subsequently removed from the mill, allowed to cool to room temperature and was reopened inside the glove box.

Subsequently, about 8.5 grams of the attrited powder were loaded in a graphite die and subjected to a hot consolidation cycle. The initial preload on the cold compact was 5 MPa. This pressure ensured that the open porosity in the compact was sufficient to completely remove the gaseous by-products of the subsequent deoxidation reaction. The atmosphere surrounding the die was evacuated to a vacuum of $10^{-2}$ Torr or better and the die was heated to 1,520° C. at a rate of ~15° C./minute and held at such temperature for a period of approximately 30 minutes to 1 hour in order to deoxidize the sample through the carbothermal reduction reaction. Subsequent to the hold period, the hot pressing chamber was backfilled with argon to a pressure of ½ an atmosphere or more and the temperature of the die was raised to 1,700° C. at a rate of ~10° C./minute. The uniaxial pressure on the sample was also simultaneously raised to 40 MPa and retained at such level. The sample was held at the peak temperature for a period of 1 hour to equilibrate the sample and to fully densify the same. After this hold period, the pressure on the sample was released and the sampled was cooled at a rate of 10° C./minute or lower to room temperature. Back-scattered electron imaging under the scanning electron microscope showed a predominantly two-phase microstructure consisting of (Mo,W)Si$_2$ and SiC, with the SiC present in volume fractions of approximately 20%. The SiC was uniformly dispersed throughout the microstructure and varied in size from 1 to 7 μm. Qualitative analysis of this sample by Energy Dispersive Spectrometry revealed that the matrix phase corresponded to a MoSi$_2$—WSi$_2$ alloy. Minor amounts of the ternary Nowotny phase were present, but in volume fractions of less than 1%. A negligible amount of silica (less than 1 volume percent) was observed under polarized light under an optical microscope. The composition of the invention would fall in that segment of the ternary diagram of FIG. 2(a) except that W therein would represent tungsten and molybdenum. MoSi$_2$ and WSi$_2$ form an isomorphous system with Mo and W freely substituting for one another in the disilicide matrix.

EXAMPLE 3

MoSi$_2$/SiC (40 v/o)

196.24 grams of silicon (–325 mesh), 220.5 grams of molybdenum (powder size 2–4 μm) and 33.349 grams of carbon (–300 mesh) were mixed in a tumbler mill (low energy mill) for approximately 12 hours. This powder mixture was then subjected to the mechanical alloying process. The mechanical alloying was accomplished in a water-cooled Szegvari attrition mill at 400 rpm under an argon gas atmosphere containing less than 10 ppm oxygen. A slight over-pressure of argon was maintained in the attrition chamber to prevent atmospheric air (and hence oxygen) from leaking into the attrition chamber. Hardened steel balls were used as the milling media. The ball-to-powder charge ratio was maintained close to 15:1. The mechanical alloying was carried out for a period of 48 hours. The powders were discharged from the mechanical attritor at this time. Subsequently, 60.07 grams of the attrited powder were loaded in a graphite die and subjected to a preload of 5 MPa. This pressure ensured that the open porosity in the compact was sufficient to enable the complete removal of the gaseous by-products of the subsequent deoxidation reaction. The atmosphere surrounding the die was evacuated to a vacuum of $10^{-2}$ Torr or better and the die was heated to 1,500° C. at a rate of ~20° C./minute and held at such temperature for a period of approximately 15 minutes to deoxidize the sample through the carbothermal reduction reaction. Subsequent to the hold period, the hot pressing chamber was back-filled with argon to a pressure of half an atmosphere or more and the temperature of the die was raised to 1,650° C. at a rate of 5° C./minute. The uniaxial pressure on the sample was also simultaneously raised to 40 MPa and maintained at that level. The sample was held at the peak temperature for a period of 1 hour to equilibrate the sample and to fully densify the same. After this hold period, the pressure on the sample was released and the sample was cooled at a rate of 10° C./minute or lower to room temperature. X-ray analysis of the sample revealed tetragonal $MoSi_2$ and SiC as the only phases detected. Back-scattered electron imaging under the scanning electron microscope showed a predominantly two-phase microstructure consisting of $MoSi_2$ and SiC, with the SiC present in volume fractions of approximately 40%. Minor amounts of the ternary Nowotny phase were present, but in volume fractions of less than 1%. A negligible amount of silica (less than 1 volume percent) was observed under polarized light under an optical microscope. The density of the sample, which was measured by the Archimedes method, was found to be 98%.

EXAMPLE 4

Hybrid Composite ($MoSi_2$/Niobium/SiC)

60 grams of the powder obtained at the end of the mechanical alloying step in Example 3 were blended with 10 grams of chopped niobium wire (diameter 250 µm) and the mixture was consolidated under identical conditions as in Example 3. A hybrid composite consisting of the in situ formed SiC particulate reinforcement and the niobium fiber reinforcement in a $MoSi_2$ matrix was formed.

EXAMPLE 5

Zirconium Silicide/Silicon Carbide (20 v/o) Composite 5.3349 grams of zirconium powder, 4.250 grams of silicon powder and 0.4146 gram of carbon were weighed and loaded with 3 numbers of ½-inch diameter hardened steel balls (milling media) into a hardened steel vial in an argon atmosphere maintained in a glove box. The vial was sealed from the outside atmosphere by means of a lid with an elastomeric O-ring. The contents of the vial were subjected to high energy attrition in a Spex mill for a period of 40 hours. During the course of the operation, the vial temperature reached 120° C. The vial was subsequently removed from the mill, allowed to cool to room temperature and reopened inside the glove box.

Subsequently, about 7.5 grams of the attrited powder were loaded in a graphite die and subjected to a hot consolidation cycle. The initial preload on the cold compact was 5 MPa. This ensured that the open porosity in the compact was sufficient for the complete removal of the gaseous by-products of the subsequent deoxidation reaction. The atmosphere surrounding the die was evacuated to a vacuum of $10^{-2}$ Torr or better and the die was heated to 1,430° C. at a rate of ~15° C./minute and held at that temperature for a period of 30 minutes in order to deoxidize the sample through the carbothermal reduction reaction. Subsequent to the hold period, the hot pressing chamber was back-filled with argon to a pressure of ½ an atmosphere or better and the die was raised to a temperature of 1,530° C. at a rate of ~10° C./minute. The uniaxial pressure on the sample was also simultaneously raised to 40 MPa and retained at that level. The sample was held at the peak temperature for a period of 40 minutes to equilibrate the sample and densify it. After this hold period, the pressure on the sample was released and the sample was cooled at an average cooling rate of approximately 15° C. to room temperature.

Back-scattered electron imaging and Energy Dispersive Spectrometry under a scanning electron microscope showed a predominantly two-phase microstructure consisting of a Zr- and Si-containing gray phase ($ZrSi_2$) and a Si-rich dark phase (SiC), with the SiC present in volume fractions of approximately 20%. The SiC was uniformly distributed throughout the microstructure and varied in size from 1 to 7 µm. Negligible amounts of silica (less than 1 volume percent) were observed under polarized light under an optical microscope.

EXAMPLE 6

Titanium Silicide/Silicon Carbide (20 v/o) Composite 3.8609 grams of titanium powder, 5.6486 grams of silicon powder and 0.4903 gram of carbon were weighed and loaded with 3 numbers of ½-inch diameter hardened steel balls (milling media) into a hardened steel vial in an argon atmosphere maintained in a glove bag. The vial was sealed from the outside atmosphere by means of a lid with an elastomeric O-ring. The contents of the vial were subjected to high energy attrition in a Spex mill for a period of 40 hours. During the course of the operation, the vial temperature reached 120° C. The vial was subsequently removed from the mill, allowed to cool to room temperature and reopened inside the glove bag. In view of the extreme reactivity of fine titanium powder to air/oxygen, particular care was taken to ensure that the oxygen content surrounding the vial was very low.

Subsequently, about 7.5 grams of the attrited powder were loaded in a graphite die under a strictly inert atmosphere and subjected to a hot consolidation cycle. The initial preload on the cold compact was 5 MPa. This ensured that the open porosity in the compact was sufficient for the complete removal of the gaseous by-products of the subsequent deoxidation reaction. The atmosphere surrounding the die was evacuated to a vacuum of $10^{-2}$ Torr or better and the die was heated to 1,430° C. at a rate of ~15° C./minute and held at that temperature for a period of 30 minutes in order to deoxidize the sample through the carbothermal reduction reaction. Subsequent to the hold period, the hot pressing chamber was backfilled with argon to a pressure of ½ an atmosphere or better and the die was raised to a temperature of 1,480° C. at a rate of ~10° C./minute. The uniaxial pressure on the sample was also simultaneously raised to 40 MPa and retained at that level. The sample was held at the peak temperature for a period of 40 minutes to equilibrate the sample and densify it. After this hold period, the pressure on the sample was released and the sample was cooled at an average cooling rate of approximately 15° C. to room temperature.

Back-scattered electron imaging and Energy Dispersive Spectrometry under a scanning electron microscope showed a predominantly two-phase microstructure consisting of a Ti- and Si-containing gray phase ($TiSi_2$) and a Si-rich dark phase (SiC), with the SiC present in volume fractions of approximately 20%. The SiC was uniformly distributed throughout the microstructure and varied in size from 1 to 7 µm. Negligible amounts of silica (less than 1 volume percent) were observed under polarized light under an optical microscope.

EXAMPLE 7

Niobium Silicide/Silicon Carbide (20 v/o) Composite 5.468 grams of niobium powder, 4.160 grams of silicon powder and 0.3718 gram of carbon were weighed and loaded with 3 numbers of ½-inch diameter hardened steel balls (milling media) into a hardened steel vial in an argon atmosphere maintained in a glove bag. The vial was sealed from the outside atmosphere by means of a lid with an elastomeric O-ring. The contents of the vial were subjected to high energy attrition in a Spex mill for a period of 40 hours. During the course of the operation, the vial temperature reached 120° C. The vial was subsequently removed from the mill, allowed to cool to room temperature and reopened inside the glove bag.

Subsequently, about 7.5 grams of the attrited powder were loaded in a graphite die and subjected to a hot consolidation cycle. The initial preload on the cold compact was 5 MPa. This ensured that the open porosity in the compact was sufficient for the complete removal of the gaseous by-products of the subsequent deoxidation reaction. The atmosphere surrounding the die was evacuated to a vacuum of $10^{-2}$ Torr or better and the die was heated to 1,450° C. at a rate of ~15° C./minute and held at that temperature for a period of 30 minutes in order to deoxidize the sample through the carbothermal reduction reaction. Subsequent to the hold period, the hot pressing chamber was back-filled with argon to a pressure of ½ an atmosphere or better and the die was raised to a temperature of 1,750° C. at a rate of ~10° C./minute. The uniaxial pressure on the sample was also simultaneously raised to 40 MPa and retained at that level. The sample was held at the peak temperature for a period of 40 minutes to equilibrate the sample and densify it. After this hold period, the pressure on the sample was released and the sample was cooled at an average cooling rate of approximately 15° C. to room temperature.

Back-scattered electron imaging and Energy Dispersive Spectrometry under a scanning electron microscope showed a predominantly two-phase microstructure consisting of a Nb- and Si-containing gray phase ($NbSi_2$) and a Si-rich dark phase (SiC), with the SiC present in volume fractions of approximately 20%. The SiC was uniformly distributed throughout the microstructure and varied in size from 1 to 7 μm. Negligible amounts of silica (less than 1 volume percent) were observed under polarized light under an optical microscope.

EXAMPLE 8

Hybrid Composite ($MoSi_2/Al_2O_3$/SiC)

7 grams of the powder obtained at the end of the mechanical alloying step in Example 3 were blended with 3 grams of alumina particulate and the mixture was consolidated under identical conditions as in Example 3. A hybrid composite consisting of the alumina particles and the in situ formed SiC in the $MoSi_2$ matrix was formed.

EXAMPLE 9

Hybrid Composite ($MoSi_2$/Molybdenum/SiC)

7 grams of the powder obtained at the end of the mechanical alloying step in Example 3 were blended with 3 grams of chopped molybdenum fiber and the mixture was consolidated under identical conditions as in Example 3. A hybrid composite consisting of the molybdenum fibers and the in situ formed SiC in the $MoSi_2$ matrix was formed. It may also be noted that it is preferable to provide an appropriate diffusion barrier layer coating, e.g., $Al_2O_3$, on the refractory metal fiber to minimize potential interactions with the surrounding matrix.

The products of the invention find utility in structural applications (e.g., aerospace structures such as turbine engines and combustors), as well as high-temperature furnace heating elements for temperatures up to 1,800° C. due to their excellent oxidation resistance, thermal stability and high electrical and thermal conductivity. Fabrication of silica-free, dense, silicide/silicon carbide composites from elemental powders consists of two major steps:

(i) preparation of mechanically alloyed powders of the desired composition based on the information from the isotherms; and (ii) consolidation of the resultant mechanically alloyed powders through appropriate consolidation processes.

Fabrication of dense, consolidated composite bodies from the mechanically alloyed powders is preferably achieved by hot pressing the powders as follows:

(a) Loading the powders from the mechanical alloying process into an appropriate die material (preferably graphite) and applying a pressure of typically less than 10 MPa on the compact so that the resultant "green body" has sufficient interconnected, i.e., open, porosity.

(b) Heating the "green body" under a vacuum of $10^{-2}$ Torr or better at a rate of between 5° C./min. and 50° C./min. to a temperature between 1,350° C. and 1,500° C.

(c) Holding the sample at the temperature for a time period sufficient to deoxidize the silica and remove the gaseous by-products of the deoxidation reaction. Preferably, the time period of the deoxidation process is between 15 minutes and 1 hour, under a vacuum of $10^{-2}$ Torr or better, in order to deoxidize the silica and remove the gaseous by-products of the deoxidation reaction, such as CO and $CO_2$.

(d) Subsequently increasing the compacting uniaxial pressure to 20-40 MPa so as to eliminate the porosity and densify the sample, while simultaneously bleeding an inert or a reducing gas into the hot pressing chamber so as to eliminate the silicon losses due to volatilization at high temperatures.

(e) Heating the sample to a peak temperature of between 1,550° C. and 1,850° C. at a ramp rate of between 5° C./min. and 50° C./min. and holding the sample at such temperature. The time period of the hold should be sufficient to equilibrate and fully densify the sample. Such densification/equilibration preferably requires a time period of between 15 minutes and 5 hours, under a uniaxial pressure of between 20 and 40 MPa. The choice of the peak consolidation temperature should be such that it is well below the melting point of the silica die.

(f) Releasing the uniaxial pressure at the end of the hold period and cooling the sample to room temperature, preferably at a rate of less than 10° C./min. so as to minimize the cracking due to thermally induced stresses.

Typical prior art procedures for forming $MoSi_2$/SiC composites involve the addition of carbon to commercial $MoSi_2$ powder. The present invention differs from these methods in several important respects:

(1) The starting (raw) materials used for the fabrication of consolidated bodies is different in the present invention when compared to the earlier publications. The present process utilizes elemental transition metal, silicon and carbon to synthesize transition metal silicides, as opposed to the use of commercial transition metal silicide powder as the starting material in the prior art.

(2) The method of transition metal silicide powder production is entirely different in the present process. The present process utilizes a solid state, high energy attrition process called mechanical alloying to synthesize a mixture of transition metal and transition metal silicide which has unique characteristics. The earlier processes use commercially available powders of the transition metal silicide compound.

(3) The present invention differs from the earlier publications regarding the intent of the carbon additions. While the earlier publications intend to utilize the carbon with the sole purpose of deoxidizing the silica in the matrix, the present invention is cognizant of the ternary transition metal-Si—C phase diagram data and deliberately uses carbon additions in order to form transition metal silicide/SiC composites with varying volume fractions of SiC, in addition to deoxidizing and removing the silica.

In accordance with the present invention, the size of the second phase particles may range from 0.1 μm to 10 μm. Larger sized second phase particles may also be produced by varying the hold time and/or hold temperature in step (e) as above.

A wide range of second phase loadings is also possible. The percentage of the second phase particles can also be varied considerably, depending on the intended application of the final composite material.

It is also possible to form composites containing alloy silicides as matrices with varying amounts of SiC reinforcements. For instance, it is well known that alloy silicides such as (Mo,W)Si$_2$ and (Mo,W)Si$_2$/SiC composites exhibit superior high temperature properties compared to the non-alloyed MoSi$_2$ and MoSi$_2$/SiC composites.

Furthermore, it is also well known that the addition of second phase ceramic particulates or whiskers or fibers may improve the short- and long-term strengths of these materials at elevated temperatures.

The structural integrity of an inherently brittle composite material is compromised when the tensile residual stresses due to CTE mismatch exceed the fracture strength of the matrix material, causing matrix cracking. Thus, while close matching of the coefficients is almost always desirable, mismatches are tolerable and do not by themselves cause loss of structural integrity as long as the thermal residual stresses do not exceed the fracture stress of the body.

While the minimization of the residual CTE mismatch stresses is essential for structural composites, it is less critical for composites used in electronic, dielectric and/or magnetic applications. In such cases, the second constituent may not strictly "reinforce" the material, but rather alter the base material's properties in a desirable manner.

For high temperature structural composites, it would be preferable to use refractory metal reinforcements. The processing technique used for the manufacture of the reinforced composites is generally independent of the coefficient of thermal expansion of the reinforcements, although it is desirable to use the lowest processing temperature in order to minimize the thermal residual stresses.

It is understood that the above description of the present invention is susceptible to considerable modifications or adaptations known to those skilled in the art. Such adaptations are to be considered within the scope of the present invention which is set forth by the appended claims.

For example, the process can be readily adapted to conventional powder metallurgical processes such as extrusion, hot-forming, hot-forging and hot-rolling. Likewise, the powders of the desired compositions as set forth could also be used in conjunction with such processes as plasma spraying.

Likewise, the powders produced by the mechanical alloying process could be used in conjunction with aligned or unaligned fibers and/or whiskers to produce directionally reinforced hybrid composites.

In advanced gas turbine engines, coatings are used to protect engine components from oxidation and hot corrosion. Conventionally, these coatings are physical vapor deposited onto the component. The component life can be limited by the life of the coating. For components subjected to high temperature, spalling of the coating due to the differences in the coefficient of thermal expansion (CTE) between the component and the coating occurs during repeated thermal cycling. Coatings derived by plasma spraying of the mechanically alloyed powders with nominal compositions located along various points on segment A enables the tailoring of the overall CTE of the coatings by controlling the relative amount of transition metal silicide and SiC.

An approach to limit these failure mechanisms is to vary the CTE of the coating by varying the transition metal silicide and SiC content in the coating. This is, in turn, controlled by the overall composition of the powders derived from mechanical alloying. Low pressure plasma spraying of the mechanical alloyed powder coating on the component could achieve this objective.

It is to be noted that silicides and silicon carbide possess excellent resistance to oxidation, especially at high temperatures, i.e., above 1,000° C.

The present invention provides the following advantages over the prior art:

(1) Greater degree of process control: The present process allowed for a greater degree of control compared to the previous processes in terms of controlling the overall stoichiometry of the powder. This is illustrated in FIG. 2 where the additions of carbon to commercial transition metal silicide as in the prior art shifts the overall composition along line 1 as indicated. As can be seen, increasing carbon additions to commercial transition metal silicide powders (prior art), while leading to SiC formation, also leads to considerable C(transition metal)$_5$Si$_3$ formation due to the nature of the process. Thus, a true transition metal silicide/SiC composite cannot be obtained in the prior art. On the other hand, the utilization of the mechanical alloying process enables the individual control of the transition metal, Si and C additions and thus makes it possible to tailor the overall composition so that it lies close to the tie line connecting the transition metal silicide and SiC. This allows the production of a transition metal silicide/SiC composite with a minimal amount of C(transition metal)$_5$Si$_3$.

(2) Increased homogeneity in the SiC distribution: The mechanical alloying process of the present invention results in the distribution of the alloying elements on a fine scale (~10 nm). Consequently, this results in a uniform distribution of the SiC particles in the transition metal silicide matrix. On the other hand, the microstructures obtained through the addition of carbon in the prior art are not as homogeneous as in the present process in terms of the SiC size and distribution due to the coarser scale of mixing in those processes.

(3) Lower consolidation temperatures: The powders produced by mechanical alloying are extremely fine (~1 μm size). It is well known that such fine powders are capable of being densified at a much lower temperature than coarser powders. Consequently, with all other process parameters being constant, mechanically alloyed powders would have a consolidation temperature at least 100° C. lower than those of commercially derived powders with larger powder sizes. This should result in substantial savings in the processing costs of these materials.

(4) More effective elimination of silica: The present invention eliminates silica from the matrix more effectively than in the prior art. The unique nature of the current process enables a very uniform distribution of carbon and, hence, very efficient deoxidation of silica in the matrix.

We claim:

1. A method for producing a substantially oxygen-free composite powder comprising $WSi_2$ and SiC comprising providing particles of tungsten, silicon and carbon in a proportion relative to each other required to produce a composite powder of $WSi_2$ and SiC having a composition in that segment of the ternary diagram of FIG. 2(a) designated A, and subjecting said particles to mechanical alloying under conditions and for a time sufficient to produce said composite powder.

2. A substantially oxygen-free composite mechanical alloy powder comprising $WSi_2$ and SiC having a composition in that segment of the ternary diagram of FIG. 2(a) designated A and, optionally, a second phase admixed therewith.

3. A method for forming a substantially oxygen-free composition of matter comprising a matrix substance comprising $WSi_2$ having SiC and, optionally, a second phase dispersed therein, said method comprising consolidating the composite powder of claim 2.

4. The method of claim 3 wherein said composite powder is consolidated by a powder metallurgical method.

5. The method of claim 4 wherein said powder metallurgical method comprises hot pressing.

6. The composition of matter formed by the method of claim 3.

7. An article of manufacture comprising the composition of matter of claim 6.

8. The method of claim 3, wherein said method of consolidation comprises two stages I and II:

I. a) compacting said powder under pressure sufficient to form the powder into a compacted shape, said pressure enabling the maintenance of open porosity substantially throughout said compact;

b) heating said compact under vacuum conditions for a time and at a temperature sufficient to result in deoxidation of said compact, essentially by a carbothermal reduction between said SiC and any silica present in said compact to form additional SiC and gaseous carbon oxides, the latter being evacuated from said compact as a result of said vacuum conditions and open porosity of said compact; said vacuum conditions and time and temperature of heating being insufficient to result in (1) significant volatilization and loss of silicon from said compact and (2) melting of said silicide; and II. consolidating the resulting compact by heating the compact under pressure, the time and temperature of heating and condition of pressure being sufficient to densify said compact while avoiding (1) losses of silicon therefrom by volatilization and (2) melting of said silicide.

9. The method of claim 8 including the step of forming said substantially oxygen-free composite powder by providing particles of tungsten, silicon and carbon in a proportion relative to each other required to produce a composite powder of $WSi_2$ and SiC having a composition in that segment of the ternary diagram of FIG. 2(a) designated A and, optionally, admixing therewith a second phase, and subjecting said particles to mechanical alloying under conditions and for a time sufficient to produce said composite powder.

10. The method of claim 8 wherein said powder is compacted in stage I. a) under a pressure of less than about 10 MPa.

11. The method of claim 8 wherein said compacted powder is heated in stage I. b) at a temperature of between about 1,350° C. and 1,500° C.

12. The method of claim 8 wherein said compacted powder is heated in stage I. b) under a vacuum of $10^{-2}$ Torr or better.

13. The method of claim 8 wherein said deoxidized compacted powder produced in stage I is consolidated in stage II at a temperature between about 1,550° C. and 1,850° C., but well below the melting point of the silicide.

14. The method of claim 8 wherein said deoxidized compacted powder produced in stage I is consolidated in stage II by heating under a pressure between about 20 and 40 MPa.

15. The method of claim 8 wherein said consolidation of said deoxidized compacted powder in stage II is carried out in an inert atmosphere.

16. The method of claim 8 including the step of cooling and recovering the cooled consolidated product.

17. The composition of matter formed by the method of claim 8.

18. An article of manufacture comprising the composition of matter of claim 17.

19. A method for producing a substantially oxygen-free composite powder comprising $NbSi_2$ and SiC comprising providing particles of niobium, silicon and carbon in a proportion relative to each other required to produce a composite powder of $NbSi_2$ and SiC having a composition in that segment of the ternary diagram of FIG. 2(b) designated A, and subjecting said particles to mechanical alloying under conditions and for a time sufficient to produce said composite powder.

20. A substantially oxygen-free composite mechanical alloy powder comprising $NbSi_2$ and SiC having a composition in that segment of the ternary diagram of FIG. 2(b) designated A and, optionally, a second phase admixed therewith.

21. A method for forming a substantially oxygen-free composition of matter comprising a matrix substance comprising $NbSi_2$ having SiC dispersed therein, said method comprising consolidating the composite powder of claim 20.

22. The method of claim 21 wherein said composite powder is consolidated by a powder metallurgical method.

23. The method of claim 22 wherein said powder metallurgical method comprises hot pressing.

24. The composition of matter formed by the method of claim 21.

25. An article of manufacture comprising the composition of matter of claim 24.

26. The method of claim 21, wherein said method of consolidation comprises two stages I and II:

I. a) compacting said powder under pressure sufficient to form the powder into a compacted shape, said pressure enabling the maintenance of open porosity substantially throughout said compact;

b) heating said compact under vacuum conditions for a time and at a temperature sufficient to result in deoxidation of said compact, essentially by a carbothermal reduction between said SiC and any silica present in said compact to form additional SiC and gaseous carbon oxides, the latter being evacuated from said compact as a result of said vacuum conditions and open porosity of said compact; said vacuum conditions and time and temperature of heating being insufficient to result in (1) significant volatilization and loss of silicon from said compact and (2) melting of said silicide; and II. consolidating the resulting compact by heating the compact under pressure, the time and temperature of heating and condition of pressure being sufficient to densify said compact while avoiding (1) losses of silicon therefrom by volatilization and (2) melting of said silicide.

27. The method of claim 26 including the step of forming said substantially oxygen-free composite powder by providing particles of niobium, silicon and carbon in a proportion relative to each other required to produce a composite powder of $NbSi_2$ and SiC having a composition in that segment of the ternary diagram of FIG. 2(b) designated A, and subjecting said particles to mechanical alloying under conditions and for a time sufficient to produce said composite powder and, optionally, admixing therewith a second phase.

28. The method of claim 26 wherein said powder is compacted in stage I. a) under a pressure of less than about 10 MPa.

29. The method of claim 26 wherein said compacted powder is heated in stage I. b) at a temperature of between about 1,350° C. and 1,500° C.

30. The method of claim 26 wherein said compacted powder is heated in stage I. b) under a vacuum of $10^{-2}$ Torr or better.

31. The method of claim 26 wherein said deoxidized compacted powder produced in stage I is consolidated in stage II at a temperature between about 1,550° C. and 1,850° C., but well below the melting point of the silicide.

32. The method of claim 26 wherein said deoxidized compacted powder produced in stage I is consolidated in stage II by heating under a pressure between about 20 and 40 MPa.

33. The method of claim 26 wherein said consolidation of said deoxidized compacted powder in stage II is carried out in an inert atmosphere.

34. The method of claim 26 including the step of cooling and recovering the cooled consolidated product.

35. The composition of matter formed by the method of claim 26.

36. An article of manufacture comprising the composition of matter of claim 35.

37. A method for producing a substantially oxygen-free composite powder comprising $ZrSi_2$ and SiC comprising providing particles of zirconium, silicon and carbon in a proportion relative to each other required to produce a composite powder of $ZrSi_2$ and SiC having a composition in that segment of the ternary diagram of FIG. 2(c) designated A, and subjecting said particles to mechanical alloying under conditions and for a time sufficient to produce said composite powder.

38. A substantially oxygen-free composite mechanical alloy powder comprising $ZrSi_2$ and SiC having a composition in that segment of the ternary diagram of FIG. 2(c) designated A and, optionally, a second phase admixed therewith.

39. A method for forming a substantially oxygen-free composition of matter comprising a matrix substance comprising $ZrSi_2$ having SiC and, optionally, a second phase dispersed therein, said method comprising consolidating the composite powder of claim 38.

40. The method of claim 39 wherein said composite powder is consolidated by a powder metallurgical method.

41. The method of claim 40 wherein said powder metallurgical method comprises hot pressing.

42. The composition of matter formed by the method of claim 39.

43. An article of manufacture comprising the composition of matter of claim 42.

44. The method of claim 39, wherein said method of consolidation comprises two stages I and II:
  I. a) compacting said powder under pressure sufficient to form the powder into a compacted shape, said pressure enabling the maintenance of open porosity substantially throughout said compact;
  b) heating said compact under vacuum conditions for a time and at a temperature sufficient to result in deoxidation of said compact, essentially by a carbothermal reduction between said SiC and any silica present in said compact to form additional SiC and gaseous carbon oxides, the latter being evacuated from said compact as a result of said vacuum conditions and open porosity of said compact; said vacuum conditions and time and temperature of heating being insufficient to result in (1) significant volatilization and loss of silicon from said compact and (2) melting of said silicide; and
  II. consolidating the resulting compact by heating the compact under pressure, the time and temperature of heating and condition of pressure being sufficient to densify said compact while avoiding (1) losses of silicon therefrom by volatilization and (2) melting of said silicide.

45. The method of claim 44 including the step of forming said substantially oxygen-free composite powder by providing particles of zirconium, silicon and carbon in a proportion relative to each other required to produce a composite powder of $ZrSi_2$ and SiC having a composition in that segment of the ternary diagram of FIG. 2(c) designated A, and subjecting said particles to mechanical alloying under conditions and for a time sufficient to produce said composite powder and, optionally, admixing therewith a second phase.

46. The method of claim 44 wherein said powder is compacted in stage I. a) under a pressure of less than about 10 MPa.

47. The method of claim 44 wherein said compacted powder is heated in stage I. b) at a temperature of between about 1,350° C. and 1,500° C.

48. The method of claim 44 wherein said compacted powder is heated in stage I. b) under a vacuum of $10^{-2}$ Torr or better.

49. The method of claim 44 wherein said deoxidized compacted powder produced in stage I is consolidated in stage II at a temperature between about 1,550° C. and 1,850° C., but well below the melting point of the silicide.

50. The method of claim 44 wherein said deoxidized compacted powder produced in stage I is consolidated in stage II by heating under a pressure between about 20 and 40 MPa.

51. The method of claim 44 wherein said consolidation of said deoxidized compacted powder in stage II is carried out in an inert atmosphere.

52. The method of claim 44 including the step of cooling and recovering the cooled consolidated product.

53. The composition of matter formed by the method of claim 44.

54. An article of manufacture comprising the composition of matter of claim 53.

55. A method for producing a substantially oxygen-free composite powder comprising $TiSi_2$ and SiC comprising providing particles of titanium, silicon and carbon in a proportion relative to each other required to produce a composite powder of $TiSi_2$ and SiC having a composition in that segment of the ternary diagram of FIG. 2(d) designated A, and subjecting said particles to mechanical alloying under conditions and for a time sufficient to produce said composite powder.

56. A substantially oxygen-free composite mechanical alloy powder comprising $TiSi_2$ and SiC having a composition in that segment of the ternary diagram of FIG. 2(d) designated A and, optionally, a second phase admixed therewith.

57. A method for forming a substantially oxygen-free composition of matter comprising a matrix substance comprising $TiSi_2$ having SiC and, optionally, a second phase dispersed therein, said method comprising consolidating the composite powder of claim 56.

58. The method of claim 57 wherein said composite powder is consolidated by a powder metallurgical method.

59. The method of claim 58 wherein said powder metallurgical method comprises hot pressing.

60. The composition of matter formed by the method of claim 57.

61. An article of manufacture comprising the composition of matter of claim 60.

62. The method of claim 57, wherein said method of consolidation comprises two stages I and II:

I. a) compacting said powder under pressure sufficient to form the powder into a compacted shape, said pressure enabling the maintenance of open porosity substantially throughout said compact;

b) heating said compact under vacuum conditions for a time and at a temperature sufficient to result in deoxidation of said compact, essentially by a carbothermal reduction between said SiC and any silica present in said compact to form additional SiC and gaseous carbon oxides, the latter being evacuated from said compact as a result of said vacuum conditions and open porosity of said compact; said vacuum conditions and time and temperature of heating being insufficient to result in (1) significant volatilization and loss of silicon from said compact and (2) melting of said silicide; and II. consolidating the resulting compact by heating the compact under pressure, the time and temperature of heating and condition of pressure being sufficient to densify said compact while avoiding (1) losses of silicon therefrom by volatilization and (2) melting of said silicide.

63. The method of claim 62 including the step of forming said substantially oxygen-free composite powder by providing particles of titanium, silicon and carbon in a proportion relative to each other required to produce a composite powder of $TiSi_2$ and SiC having a composition in that segment of the ternary diagram of FIG. 2(d) designated A, and subjecting said particles to mechanical alloying under conditions and for a time sufficient to produce said composite powder and, optionally, admixing therewith a second phase.

64. The method of claim 62 wherein said powder is compacted in stage I. a) under a pressure of less than about 10 MPa.

65. The method of claim 62 wherein said compacted powder is heated in stage I. b) at a temperature of between about 1,350° C. and 1,500° C.

66. The method of claim 62 wherein said compacted powder is heated in stage I. b) under a vacuum of $10^{-2}$ Torr or better.

67. The method of claim 62 wherein said deoxidized compacted powder produced in stage I is consolidated in stage II at a temperature between about 1,550° C. and 1,850° C., but well below the melting point of the silicide.

68. The method of claim 62 wherein said deoxidized compacted powder produced in stage I is consolidated in stage II by heating under a pressure between about 20 and 40 MPa.

69. The method of claim 62 wherein said consolidation of said deoxidized compacted powder in stage II is carried out in an inert atmosphere.

70. The method of claim 62 including the step of cooling and recovering the cooled consolidated product.

71. The composition of matter formed by the method of claim 62.

72. An article of manufacture comprising the composition of matter of claim 71.

73. A method for producing a substantially oxygen-free composite powder comprising $WSi_2$, $MoSi_2$ and SiC comprising providing particles of tungsten, molybdenum, silicon and carbon in a proportion relative to each other required to produce a composite powder of $WSi_2$, $MoSi_2$ and SiC having a composition in that segment of the ternary diagram of FIG. 2(a) designated A wherein W represents tungsten and molybdenum, and subjecting said particles to mechanical alloying under conditions and for a time sufficient to produce said composite powder.

74. A substantially oxygen-free composite mechanical alloy powder comprising $WSi_2$, $MoSi_2$ and SiC having a composition in that segment of the ternary diagram of FIG. 2(a) designated A wherein W represents tungsten and molybdenum and, optionally, said powder additionally containing a second phase.

75. A method for forming a substantially oxygen-free composition of matter comprising a matrix substance comprising $WSi_2$ and $MoSi_2$ having SiC and, optionally, a second phase dispersed therein, said method comprising consolidating the composite powder of claim 74.

76. The method of claim 75 wherein said composite powder is consolidated by a powder metallurgical method.

77. The method of claim 76 wherein said powder metallurgical method comprises hot pressing.

78. The composition of matter formed by the method of claim 75.

79. An article of manufacture comprising the composition of matter of claim 78.

80. The method of claim 75, wherein said method of consolidation comprises two stages I and II:

I. a) compacting said powder under pressure sufficient to form the powder into a compacted shape, said pressure enabling the maintenance of open porosity substantially throughout said compact;

b) heating said compact under vacuum conditions for a time and at a temperature sufficient to result in deoxidation of said compact, essentially by a carbothermal reduction between said SiC and any silica present in said compact to form additional SiC and gaseous carbon oxides, the latter being evacuated from said compact as a result of said vacuum conditions and open porosity of said compact; said vacuum conditions and time and temperature of heating being insufficient to result in (1) significant volatilization and loss of silicon from said compact and (2) melting of said silicide; and II. consolidating the resulting compact by heating the compact under pressure, the time and temperature of heating and condition of pressure being sufficient to densify said compact while avoiding (1) losses of silicon therefrom by volatilization and (2) melting of said silicide.

81. The method of claim 80 including the step of forming said substantially oxygen-free composite powder by providing particles of tungsten, molybdenum, silicon and carbon in a proportion relative to each other required to produce a composite powder of $WSi_2$, $MoSi_2$ and SiC having a composition in that segment of the ternary diagram of FIG. 2(a)

designated A wherein W represents tungsten and molybdenum, and subjecting said particles to mechanical alloying under conditions and for a time sufficient to produce said composite powder and, optionally, admixing therewith a second phase.

82. The method of claim 80 wherein said powder is compacted in stage I. a) under a pressure of less than about 10 MPa.

83. The method of claim 80 wherein said compacted powder is heated in stage I. b) at a temperature of between about 1,350° C. and 1,500° C.

84. The method of claim 80 wherein said compacted powder is heated in stage I. b) under a vacuum of $10^{-2}$ Torr or better.

85. The method of claim 80 wherein said deoxidized compacted powder produced in stage I is consolidated in stage II at a temperature between about 1,550° C. and 1,850° C., but well below the melting point of the silicide.

86. The method of claim 80 wherein said deoxidized compacted powder produced in stage I is consolidated in stage II by heating under a pressure between about 20 and 40 MPa.

87. The method of claim 80 wherein said consolidation of said deoxidized compacted powder in stage II is carried out in an inert atmosphere.

88. The method of claim 80 including the step of cooling and recovering the cooled consolidated product.

89. The composition of matter formed by the method of claim 80.

90. An article of manufacture comprising the composition of matter of claim 89.

91. A substantially oxygen-free composite mechanical alloy powder comprising $MoSi_2$ and SiC having a composition in that segment of the ternary diagram of FIG. 1 designated A and admixed therewith a second phase.

92. A method for forming a substantially oxygen-free composition of matter comprising a matrix substance comprising $MoSi_2$ having SiC and, optionally, a second phase dispersed therein, said method comprising consolidating the composite powder of claim 91.

93. The method of claim 92 wherein said composite powder is consolidated by a powder metallurgical method.

94. The method of claim 93 wherein said powder metallurgical method comprises hot pressing.

95. The composition of matter formed by the method of claim 92.

96. An article of manufacture comprising the composition of matter of claim 95.

97. The method of claim 92, wherein said method of consolidation comprises two stages I and II:

I. a) compacting said powder under pressure sufficient to form the powder into a compacted shape, said pressure enabling the maintenance of open porosity substantially throughout said compact;

b) heating said compact under vacuum conditions for a time and at a temperature sufficient to result in deoxidation of said compact, essentially by a carbothermal reduction between said SiC and any silica present in said compact to form additional SiC and gaseous carbon oxides, the latter being evacuated from said compact as a result of said vacuum conditions and open porosity of said compact; said vacuum conditions and time and temperature of heating being insufficient to result in (1) significant volatilization and loss of silicon from said compact and (2) melting of said silicide; and II. consolidating the resulting compact by heating the compact under pressure, the time and temperature of heating and condition of pressure being sufficient to densify said compact while avoiding (1) losses of silicon therefrom by volatilization and (2) melting of said silicide.

98. The method of claim 97 including the step of forming said substantially oxygen-free composite powder by providing particles of molybdenum, silicon and carbon in a proportion relative to each other required to produce a composite powder of $MoSi_2$ and SiC having a composition in that segment of the ternary diagram of FIG. 1 designated A, and subjecting said particles to mechanical alloying under conditions and for a time sufficient to produce said composite powder and, optionally, admixing therewith said second phase.

99. The method of claim 97 wherein said powder is compacted in stage I. a) under a pressure of less than about 10 MPa.

100. The method of claim 97 wherein said compacted powder is heated in stage I. b) at a temperature of between about 1,350° C. and 1,500° C.

101. The method of claim 97 wherein said compacted powder is heated in stage I. b) under a vacuum of $10^{-2}$ Torr or better.

102. The method of claim 97 wherein said deoxidized compacted powder produced in stage I is consolidated in stage II at a temperature between about 1,550° C. and 1,850° C., but well below the melting point of the silicide.

103. The method of claim 97 wherein said deoxidized compacted powder produced in stage I is consolidated in stage II by heating under a pressure between about 20 and 40 MPa.

104. The method of claim 97 wherein said consolidation of said deoxidized compacted powder in stage II is carried out in an inert atmosphere.

105. The method of claim 97 including the step of cooling and recovering the cooled consolidated product.

106. The composition of matter formed by the method of claim 97.

107. An article of manufacture comprising the composition of matter of claim 106.

* * * * *